United States Patent
Touchette (10) Patent No.: US 12,520,837 B2
(45) Date of Patent: Jan. 13, 2026

(54) VENTILATED HANGING GAME BAG

(71) Applicant: Neil Touchette, Dundas, MN (US)

(72) Inventor: Neil Touchette, Dundas, MN (US)

( * ) Notice: Subject to any disclaimer, the term of this patent is extended or adjusted under 35 U.S.C. 154(b) by 154 days.

(21) Appl. No.: 18/500,023

(22) Filed: Nov. 1, 2023

(65) Prior Publication Data

US 2025/0134092 A1    May 1, 2025

(51) Int. Cl.
| | | |
|---|---|---|
| *A01M 31/00* | (2006.01) | |
| *B65D 30/08* | (2006.01) | |
| *B65D 33/01* | (2006.01) | |
| *B65D 33/10* | (2006.01) | |
| *B65D 33/14* | (2006.01) | |
| *B65D 33/25* | (2006.01) | |

(52) U.S. Cl.
CPC .......... *A01M 31/006* (2013.01); *B65D 29/02* (2013.01); *B65D 33/01* (2013.01); *B65D 33/10* (2013.01); *B65D 33/14* (2013.01); *B65D 33/2508* (2013.01)

(58) Field of Classification Search
CPC . A01M 31/006; A01K 1/0254; A01K 1/0236; A61G 17/06; B65D 33/01; B65D 33/14; A45C 13/103
USPC ....................................................... 383/117
See application file for complete search history.

(56) References Cited

U.S. PATENT DOCUMENTS

| | | | | |
|---|---|---|---|---|
| 4,690,045 | A * | 9/1987 | Badger ................. | A01M 31/00 99/485 |
| 5,323,897 | A * | 6/1994 | Sperber ................. | D06F 95/002 383/117 |
| 6,253,569 | B1 * | 7/2001 | Hall ........................ | A23G 9/44 62/457.2 |
| 6,386,414 | B1 * | 5/2002 | Kilduff .................. | A45C 13/02 383/102 |
| 6,446,577 | B1 * | 9/2002 | Salahor ................ | A01K 1/0254 119/470 |
| 6,508,077 | B1 * | 1/2003 | Vander Boegh ..... | A22B 5/0076 62/530 |
| 6,510,705 | B1 * | 1/2003 | Jackson ............. | B65D 81/3813 62/457.2 |
| 6,520,120 | B1 * | 2/2003 | Arnold ................. | A01K 13/001 119/678 |
| 7,240,513 | B1 * | 7/2007 | Conforti ................ | A45C 13/02 62/457.2 |
| 8,562,213 | B1 | 10/2013 | McBee | |
| 8,936,172 | B2 * | 1/2015 | Hicks ...................... | A45C 3/00 383/110 |
| 9,181,022 | B2 * | 11/2015 | Armstrong ............... | A45C 5/00 |
| 2009/0032562 | A1 * | 2/2009 | Glass ..................... | A45C 11/00 119/843 |
| 2023/0270075 | A1 * | 8/2023 | Cutler .................. | A01K 1/0272 119/453 |

* cited by examiner

Primary Examiner — Nathan J Newhouse
Assistant Examiner — Nina K Attel
(74) Attorney, Agent, or Firm — Bradley J. Thorson; DeWitt LLP (57) ABSTRACT

Light-weight, collapsible and well-ventilated game bags having a circulating fan adapted to promote air circulated into, out of and throughout the game bags may be used by hunters to store and transport game that has been field dressed in a way that prevents contamination, spoilation and rotting of meat.

18 Claims, 13 Drawing Sheets

VENTILATED HANGING GAME BAG

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates generally to hanging game bags and, more particularly, to game bags useful for storing, transporting, and preserving in the field after harvesting the meat of large game such as deer, elk, and moose.

2. Discussion of the Prior Art

The need for hunters to field dress game harvested in the field to preserve the meat of the harvested animal is well-known in the art. Field dressing is typically performed as soon possible after the animal is killed to ensure rapid body heat loss, which prevents bacteria from growing on the surface of the carcass.

After field dressing the animal, it is important to protect the carcass from contamination by dirt or debris, and from insects, rodents, birds, and other animals that are attracted to the carcass for feeding purposes. Many hunters choose to enclose the dressed carcasses in game bags made of cheesecloth or canvas. These game bags adequately protect the carcass from the foregoing. Such game bags, however, are less than ideal since they interfere with airflow to, from, and around the exposed surfaces of the carcass. Such airflow is necessary to permit the carcass to both dry and cool. The absence of proper airflow can lead to heat building up resulting in significant problems, for example soilage and rotting of the meat.

Various attempts have been made in the prior art to provide an improved game bag. For example, U.S. Pat. No. 8,562,213 granted to Krystal McBee discloses a game bag fabricated of a water-resistive heavy canvas with open-screen netting sections at the bottom and center of the bag. Alternatively, the game bag may be constructed of an outer layer envisioned to be capable of withstanding environmental effects and an inside layer envisioned to be easily washable so that the blood may be removed therefrom. In either case, the game bag has an upper opening sinched closed by a strap. This strap constricts the entire periphery of the upper opening to form a tight seal about said upper opening such that air flow between the interior of the game bag and the ambient environment is solely through the open-screen netting sections at the bottom and center of the bag. In addition to the straps, a zipper extends from the upper opening towards but stopping short of the bottom open-screen netting section. No mechanism for sealing either of the open-screen netting sections when it is desirable to do so. No device is provided for forcing any airflow through either of the open-screen netting sections. For these and other reasons, even the game bags disclosed in U.S. Pat. No. 8,562,213 are less than ideal.

SUMMARY OF THE INVENTION

The present invention relates to game bags comprising a chamber defined by a shell having a top wall, bottom wall, a rear wall and opposing side walls that are all substantially planar, and a front wall having a substantially planar lower section and an upper nose section projecting outwardly from the planar lower section. The shell further comprising a zippered opening extending through the top wall and rear wall. At least one upper mesh covered opening extends through the rear wall and provides a first airflow path through the rear wall. At least one upper flap adapted to selectively extend over and close the at least one upper mesh covered opening is also provided. Also provided is at least one lower mesh covered opening extending through the lower section of the front wall and providing a second airflow path through the front wall. At least one lower flap adapted to selectively extend over and close the at least one lower mesh covered opening is also provided. Such game bags also comprise a bracket adapted to mount a circulating fan to the shell at a location such that when the fan is operating the fan causes air to flow along the first flow path, the second flow path, and within the chamber.

The shell of the game bags may have a multi-layer construction comprising an outer layer of polyester, a middle layer comprising a fabric made of a plastic closed cell fiber, and an inner layer of a thin waterproof fabric.

A plurality of drain holes may be provided through the bottom wall. When such drain holes are provided, the bottom wall may be or comprise a mesh layer adapted to prevent ingress of insects and other small animals into the game bag's chamber.

The game bags may include various fasteners in addition to the zipper of the zippered opening. Such additional fasteners may include a first fastener adapted to hold the first flap in a first open position, a second fastener adapted to hold the first flap in a first closed position, a third fastener adapted to hold the second flap in a second open position and a fourth fastener adapted to hold the second flap in a second closed position. The first fastener, second fastener, third fastener and fourth fastener may each be a hook and loop type fastener. Snaps, buttons, buckles and other known types of fasteners may also be employed.

To provide increased airflow, the size of the mesh covered openings may be increased or additional mesh covered openings may be provided. For example, the game bags may comprise at least two upper mesh covered openings extending through the rear wall.

The game bags may include additional features such as one or more loops, handles and straps. For example, loops extending from the shell adjacent to the bottom wall can be used for a variety of purposes such as to attach a rope to the game bag or to stake the bottom of the game bag to the ground. One or more handles may be coupled to the shell to make it easier to manipulate and transport the shell. Such handles will typically be secured to the top wall or bottom wall, but may be secured to any of the walls. One or more straps may be coupled to the shell. These straps may be adapted to hold the shell in a rolled-up position when the game bag is not in use for transport or storage in various ways such as by providing the ends with elements of a buckle, snap, or hook and loop type fastener. Straps may also be provided to hold the shell open when the zipper is unzipped for cleaning or drying of the interior of the shell.

BRIEF DESCRIPTION OF THE DRAWINGS

The foregoing features, objects and advantages of the invention will become apparent to those skilled in the art from the following detailed description and with reference to the following drawings in which like numerals in the several views refer to corresponding parts.

DETAILED DESCRIPTION

This description of the preferred embodiment is intended to be read in connection with the accompanying drawings, which are to be considered part of the entire written description of this invention. In the description, relative terms such as "lower", "upper", "horizontal", "vertical", "above", "below", "up", "down", "top" and "bottom", "under", as well as derivatives thereof (e.g., "horizontally", "downwardly", "upwardly", "underside", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "joined", and "joining" are used interchangeably and refer to one structure or surface being secured to another structure or surface or integrally fabricated in one piece unless expressly described otherwise.

The drawings illustrate a game bag 1 in its unfolded/unrolled configuration. Game bag 1 comprises a chamber 2 defined by a shell 3. The shell 3 has a top wall 4, bottom wall 5, rear wall 6, and opposing side walls 7 and 8. The top wall 4, bottom wall 5, rear wall 6 and opposing side walls 7 and 8 are all substantially planar when the game bag 1 in its unfolded/unrolled configuration shown. The game bag 1 further comprises a front wall 10 having a substantially planar lower section 11 and an upper nose section 12 projecting outwardly from the planar lower section 11. The upper nose section 12 is provided to adapt chamber 2 to accommodate the hind legs of the carcass when the "Tenderstretch" method of hanging a field dressed carcass is employed. See illustration B in FIG. 15.

The shell 1 has a zippered opening 14 extending through and substantially all the way across the top wall 4. Zippered opening 14 further extends through the rear wall 6 from the rear wall's intersection with the top wall 4 substantially all the way down the rear wall 6 to where the rear wall 6 intersects with the bottom wall 5. This arrangement provides certain benefits. First, the game bag 1 may be open wide for placement of field dressed game in the chamber 2, or for subsequent cleaning of the interior surfaces of the game bag. Once game has been positioned within chamber 2, the zipper 15 of the zippered opening 14 can be easily operated to close the zippered opening 14 to retain the shell 3 of the game bag around the game. Later, the zipper 15 can again be actuated to fully open the shell 3 making it easy to remove game from the shell 3.

Figure 3:
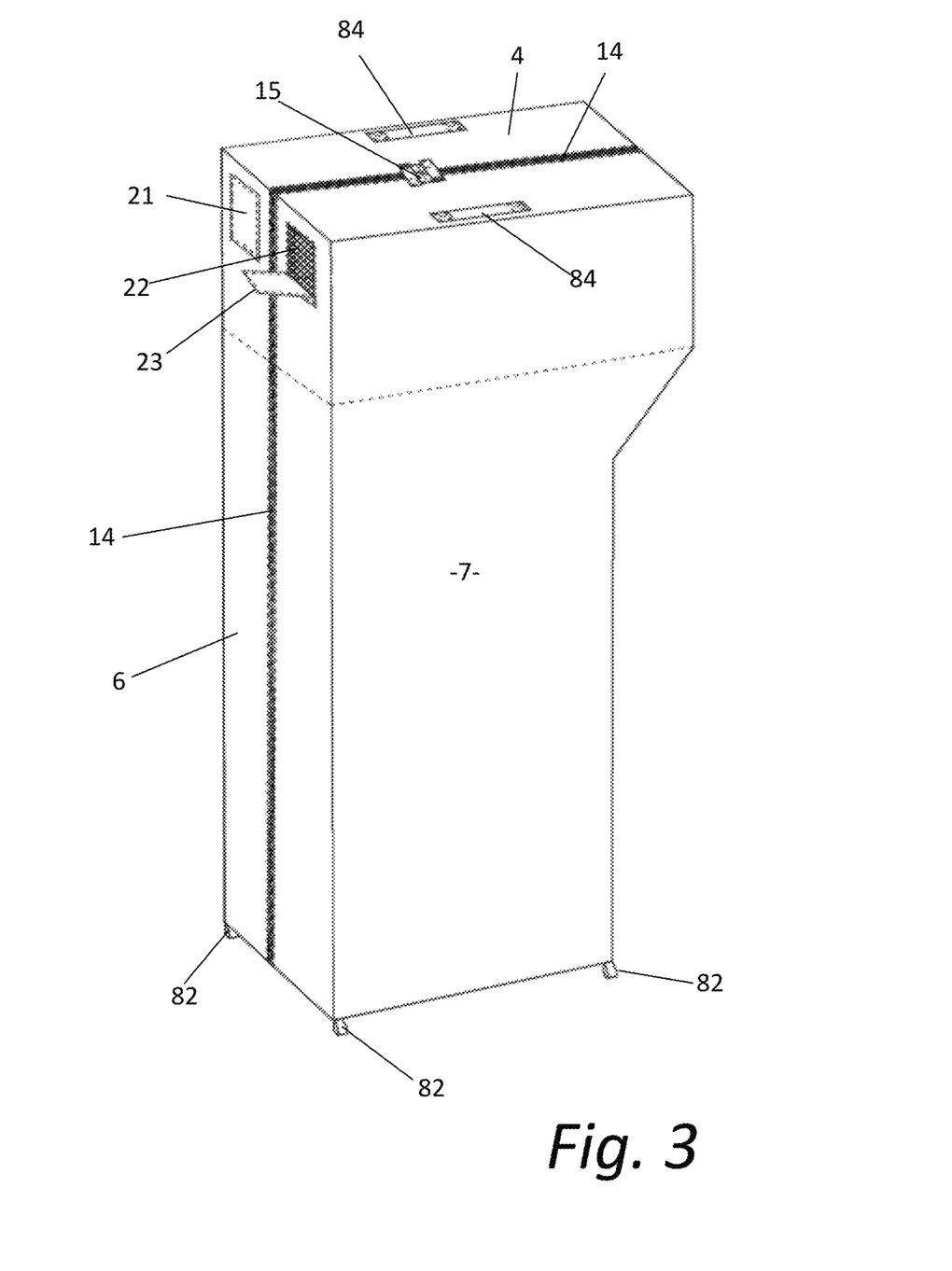
FIG. 3 is a third perspective view of the game bag of FIG. 1 with a flap closing a first top mesh opening and a second flap partially opened to reveal a second top mesh opening.
Figure 4:
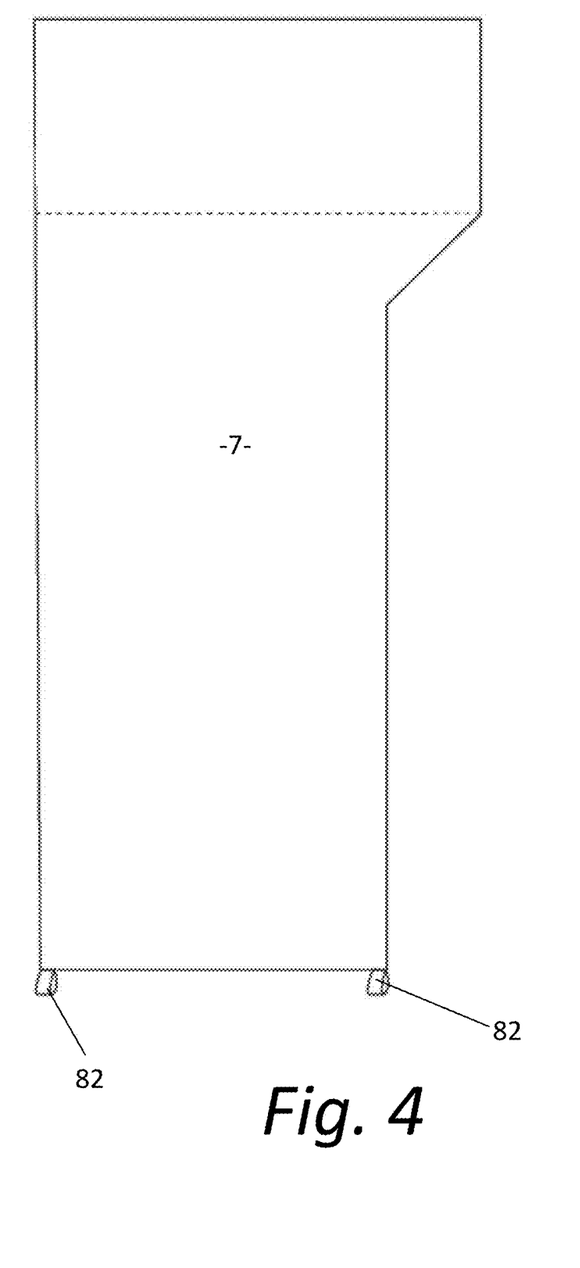
FIG. 4 is a side view of the game bag of FIG. 1.
Figure 5:
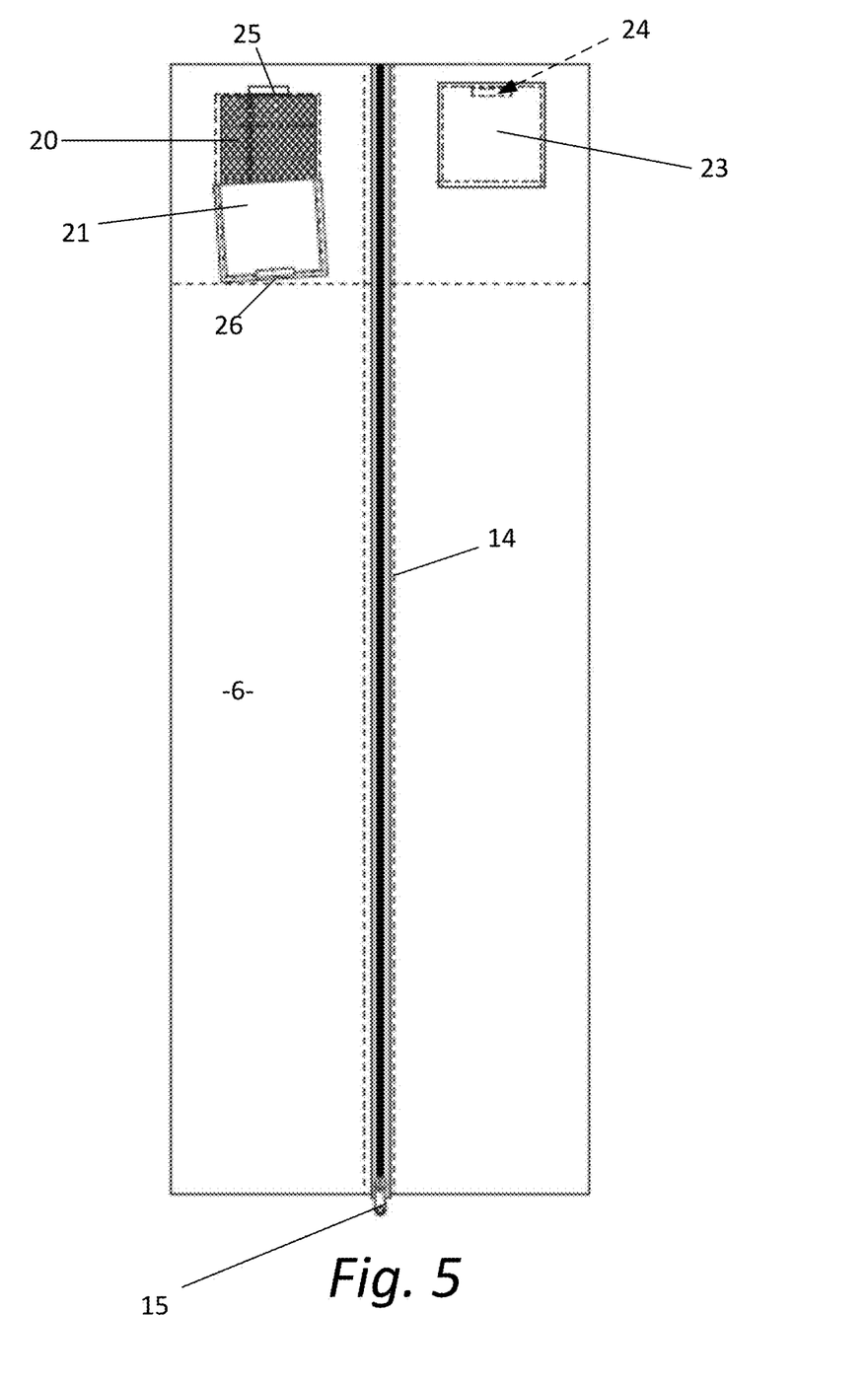
FIG. 5 is a rear view of the game bag of FIG. 1.
Figure 6:
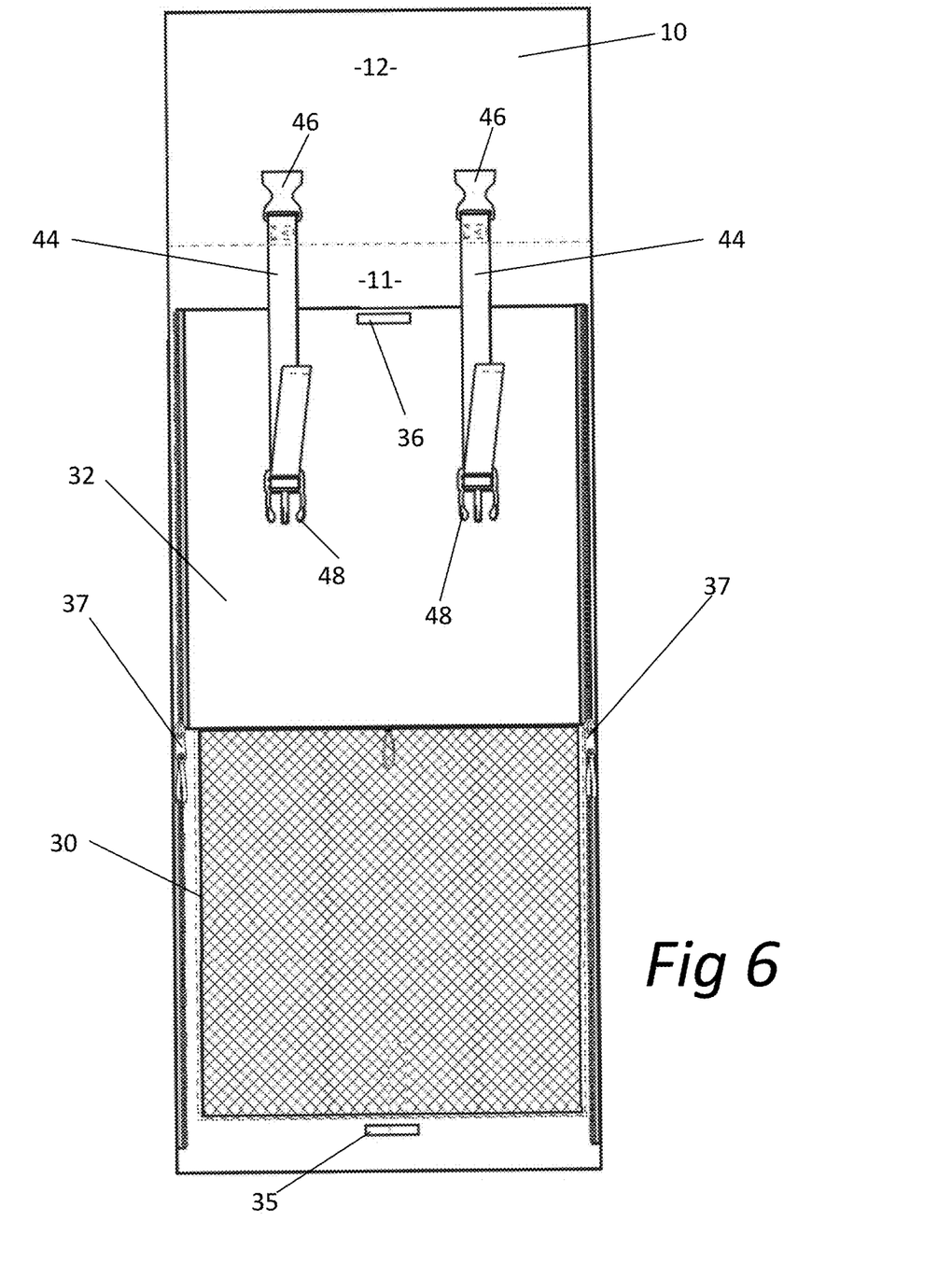
FIG. 6 is a front view of the game bag of FIG. 1.
Figure 7:
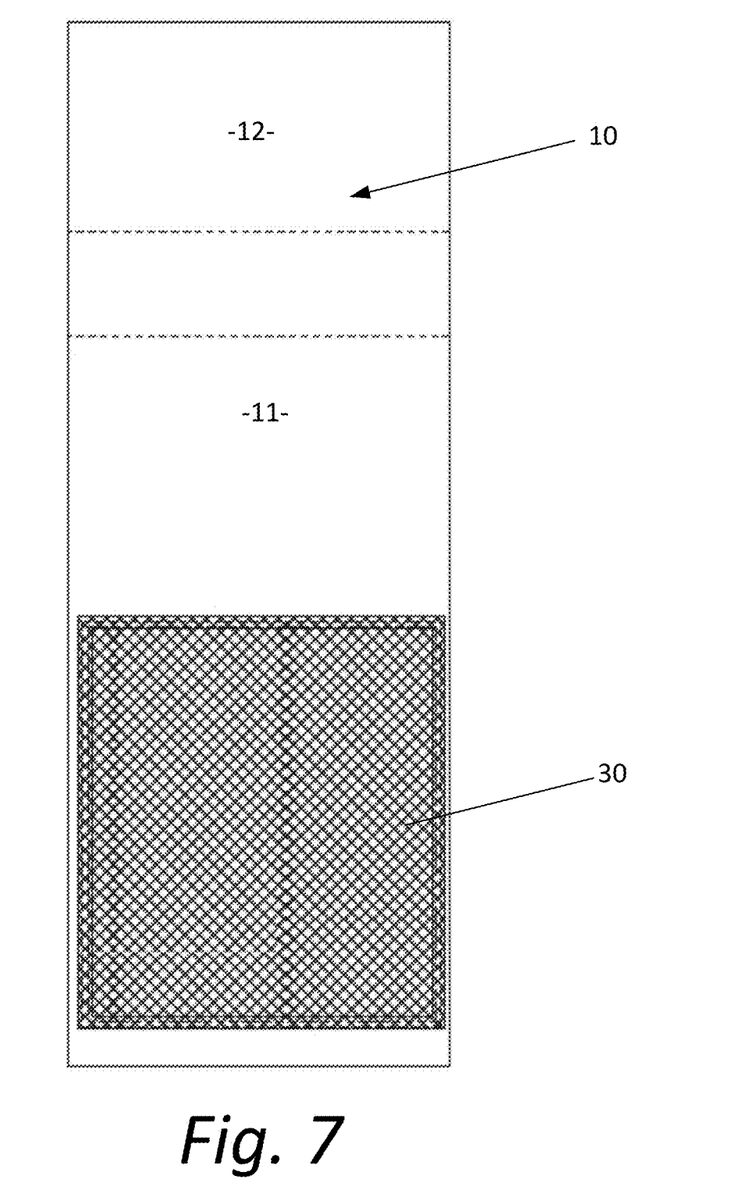
FIG. 7 is a view of the back of the front wall of a game bag of FIG. 1.
Figure 8:
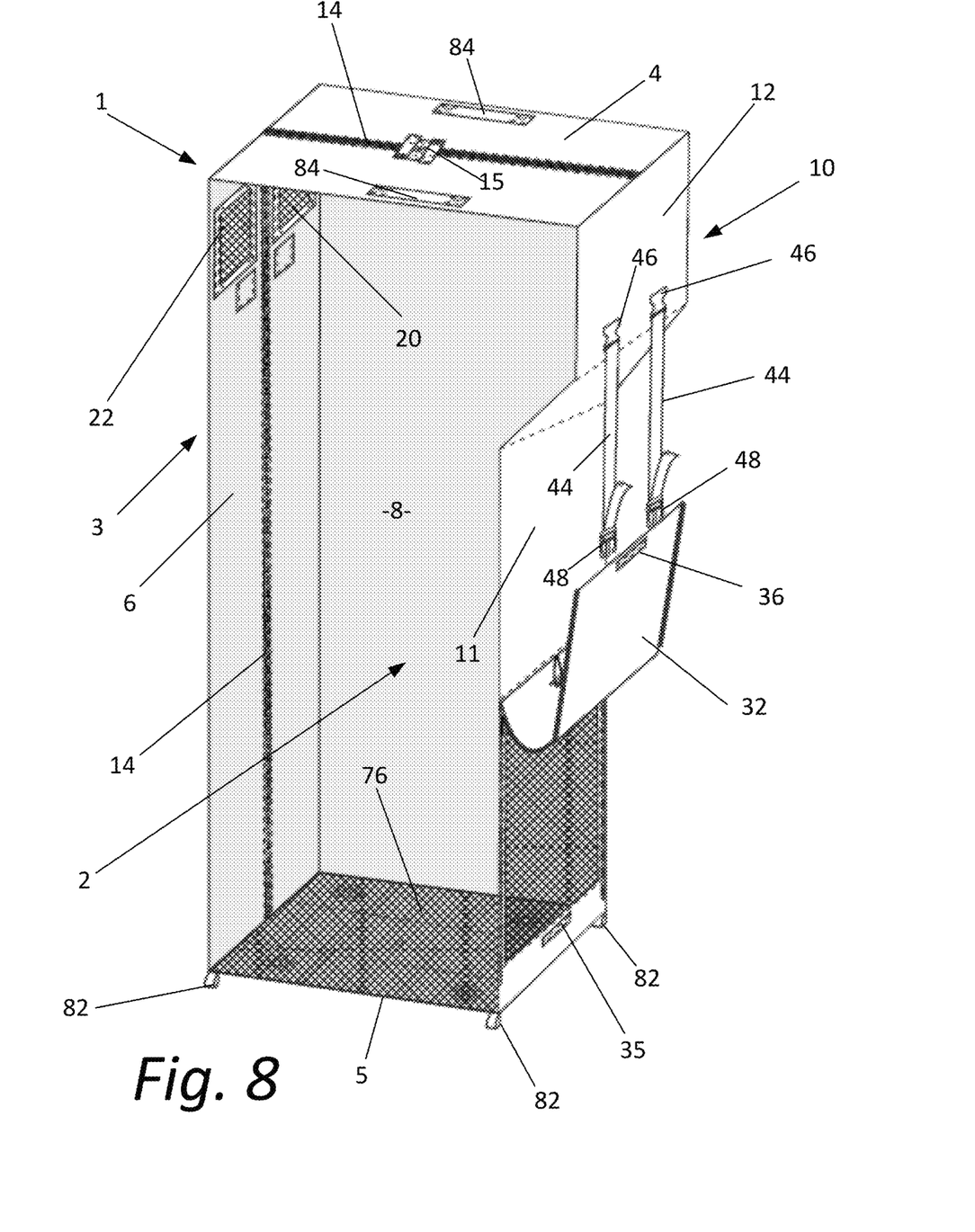
FIG. 8 is a cross-sectional perspective view showing the interior of the game bag of FIG. 1.
Figure 9:
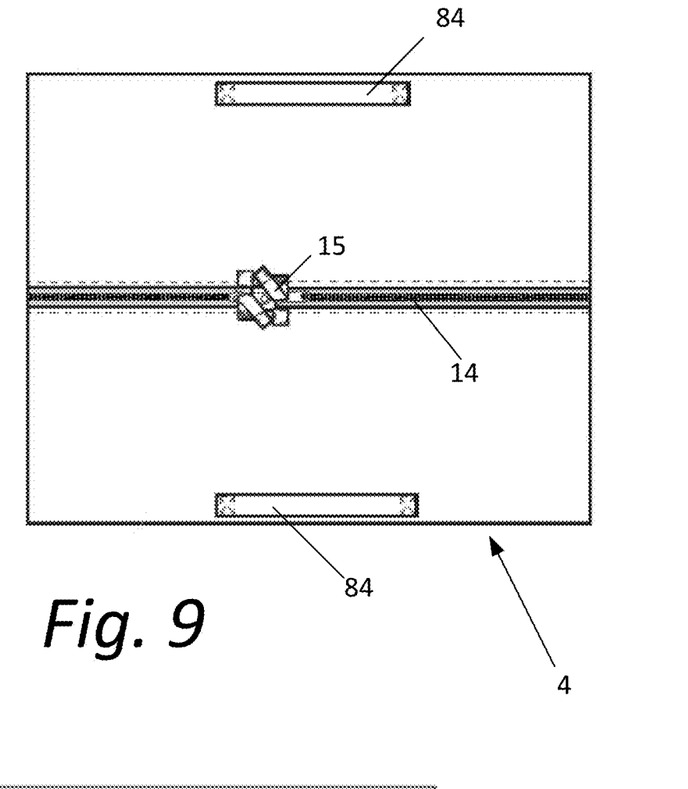
FIG. 9 is a top view of the game bag of FIG. 1.
Figure 10:
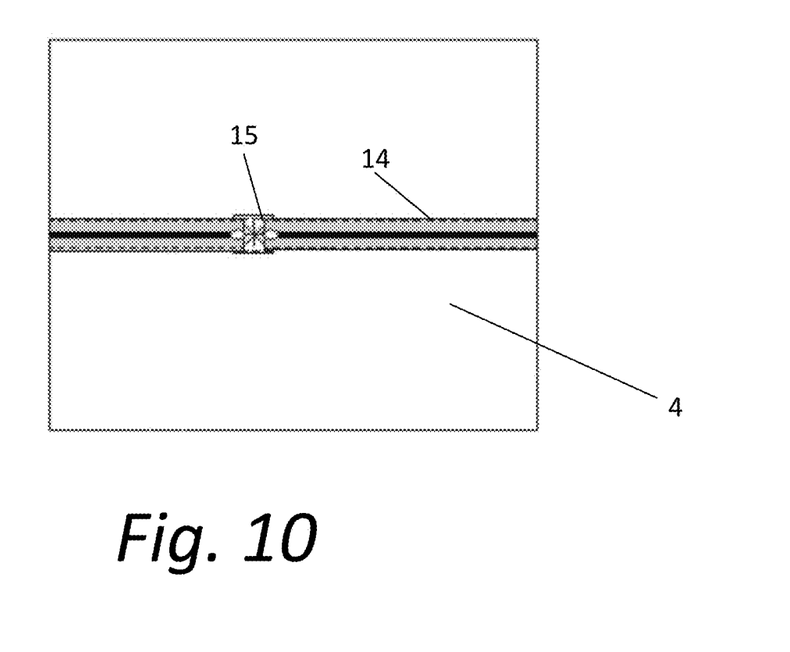
FIG. 10 is a bottom view of the top wall of the game bag of FIG. 1.
Figure 11:
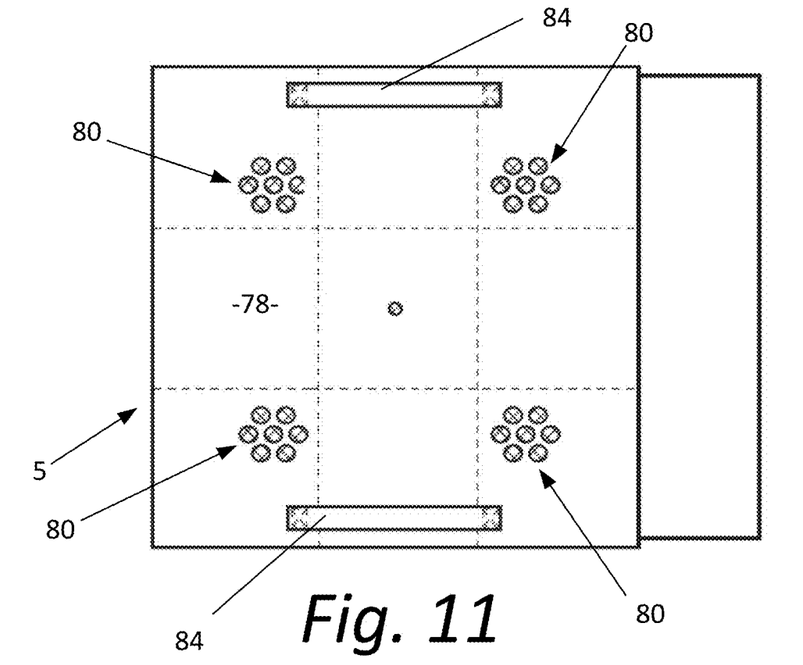
FIG. 11 is a bottom view of the game bag of FIG. 1.
Figure 12:
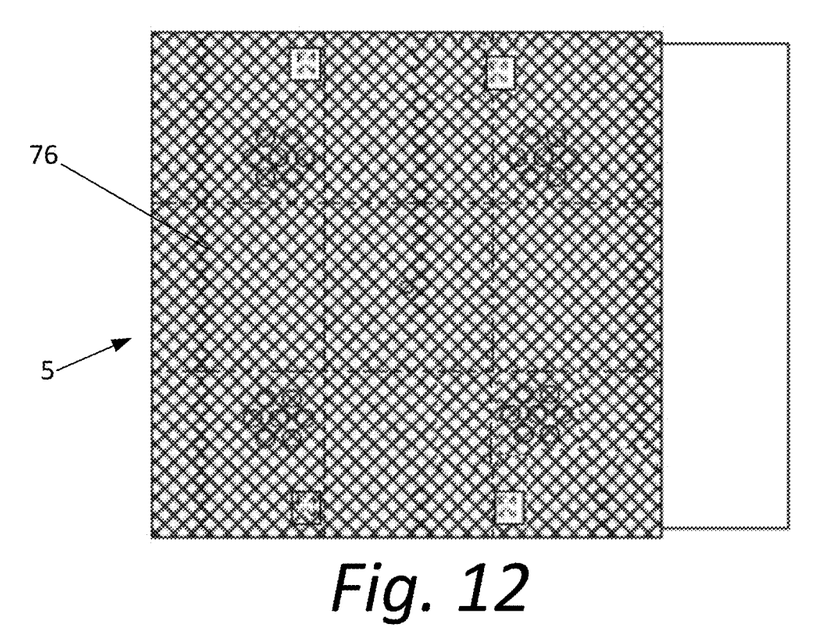
FIG. 12 is a top view of the bottom wall of the game bag of FIG. 1.

As shown in FIGS. 3, 5 and 8, an upper mesh covered opening 20 and an upper mesh covered opening 22, each extend through the rear wall 6, are provided. The upper mesh covered openings 20 and 22 are adapted to provide upper airflow paths through the rear wall 6 while preventing ingress of insects and other animals. Upper flaps 21 and 23 are also provided. Upper flap 21 is adapted to selectively extend over and close the upper mesh covered opening 20 and flap 23 is similarly provided to selectively extend over and close the upper mesh covered opening 22. Fasteners 24 are provided to secure the upper flaps 21 and 23 in their closed position over the respective mesh openings 20 and 22. As shown, the fasteners 24 are hook and loop type fasteners comprising a pad of loop material 25 permanently attached to the rear wall 6 just above the corresponding upper mesh covered opening 20 or 22, and a cooperating pad of hook material 26 permanently attached to the corresponding flap 21 or 23.

As shown in FIGS. 1, 2, 6, 7, and 8, at least one lower mesh covered opening 30 extends through the lower section 11 of the front wall 10. Lower mesh covered opening 30 is adapted to provide a lower airflow path through the front wall 10. A lower flap 32 is provided. Lower flap 32 is adapted to selectively extend over and close the lower mesh covered opening 30. As shown, lower flap 32 is permanently attached to shell 3 at a location immediately above the lower mesh covered opening 30. A fastener is provided to secure the lower flap 32 in its closed position over lower mesh covered opening 30. As shown, this fastener is a hook and loop type fastener comprising a pad of loop material 35 permanently attached to the front wall 10 just below the corresponding lower mesh covered opening 30 and a cooperating pad of hook material 36 is permanently attached to the lower flap 32. Zippers 37 may also be provided to close the two sides of the lower flap 32. In alternative embodiments, the lower flap 32 may be an entirely separate panel. The sides of such a flap 32 may be attached using the zippers 37, the bottom may be attached using the hook and loop fastener 35/36. A fastener 38 may also be provided to secure the top of the flap 32. Fastener 38 comprises a button loop 39 secured to the front wall 10 just above the lower mesh covered opening 30 and a cooperating button 40 attached to lower flap 32.

When the flap 32 is permanently attached to the shell 3, various means may be provided to hold the lower flap in the open position. If the lower flap 32 is fixed to the front wall 10 of the shell 3 at the bottom of the lower mesh covered opening 30, gravity may suffice. If the lower flap 32 is fixed to front wall 10 of the shell at the top of the lower mesh covered opening 30, a fastener will typically be provided to hold the lower flap in the open position. This fastener may be button loop and button type fastener, a hook and loop type fastener, a snap fastener, or buckle fastener. As shown in the drawings a pair of straps 44, each having buckle elements 46 and 48, are shown attached to and descending from the upper nose section 12 of the front wall 10. The lower flap 32 may be provided with corresponding buckle elements at the free end of the lower flap 32 and adapted to be selectively fastened to the buckle elements 48. In the embodiment shown, straps 44 are provided so that an empty and clean game bag 1 can be secured in a rolled-up configuration for storage and transport. The game bag 1 may be conveniently retained in this configuration by extending the straps 44 around the rolled-up shell 3 and selectively connecting together the buckle elements 46 and 48 of each of the straps.

Figure 13:
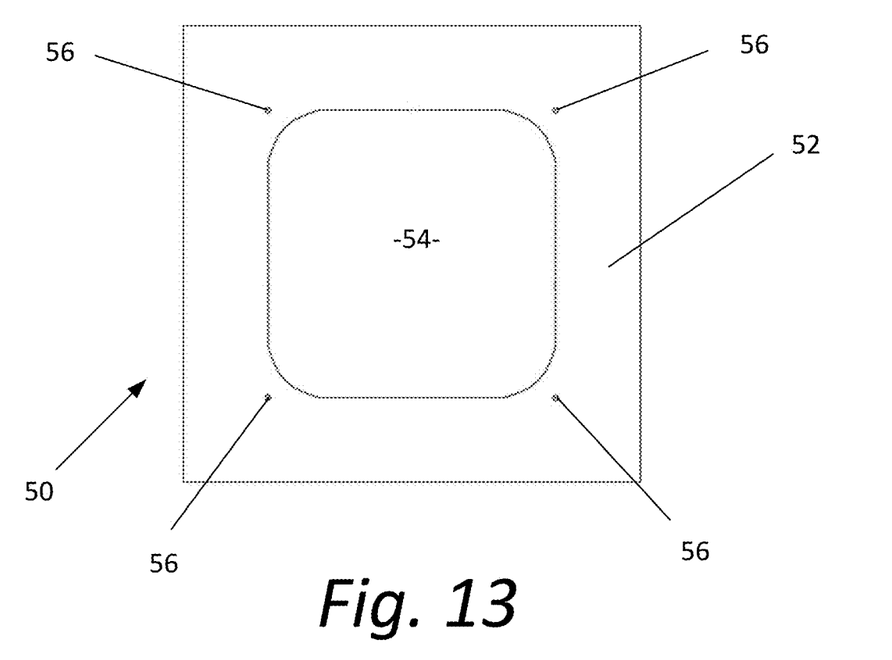
FIG. 13 is a plan view of a bracket used to couple a fan the shell of the game bag of FIG. 1.
Figure 14:
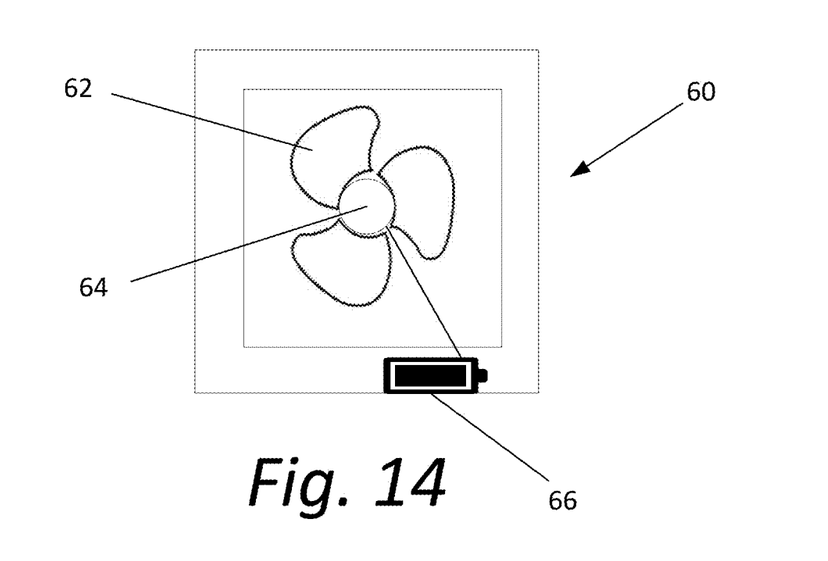
FIG. 14 is a schematic diagram showing a fan operated by a battery powered motor.

Game bag 1 shown in the drawings further comprises at least one bracket 50. See FIG. 13. Bracket 50 has an outer frame 52 and a central opening 54. The outer frame is adapted to be fixed to the inside of the shell 3 about a selected one of the mesh covered openings 20, 21 or 30 so the selected mesh covered opening is in fluid communication with the central opening 55 of the bracket 50. The bracket also has a plurality of mounting holes 56 adapted to permit a fan assembly 60 to be mounted to the bracket 50. The fan assembly 60 has one or more fan blades 62 rotated by an electric motor 64 which may be powered by a battery 66. A safety cage (not shown) surrounding the rotating fan blades may also be provided. Such a fan assembly, when energized, enhances airflow between chamber 2 and the ambient environment. This enhanced airflow not only exists through the mesh covered opening over which the bracket 50 and fan assembly 60 are placed, but also throughout the chamber 2 and through the other mesh covered openings of the game bag 1.

Figure 1:
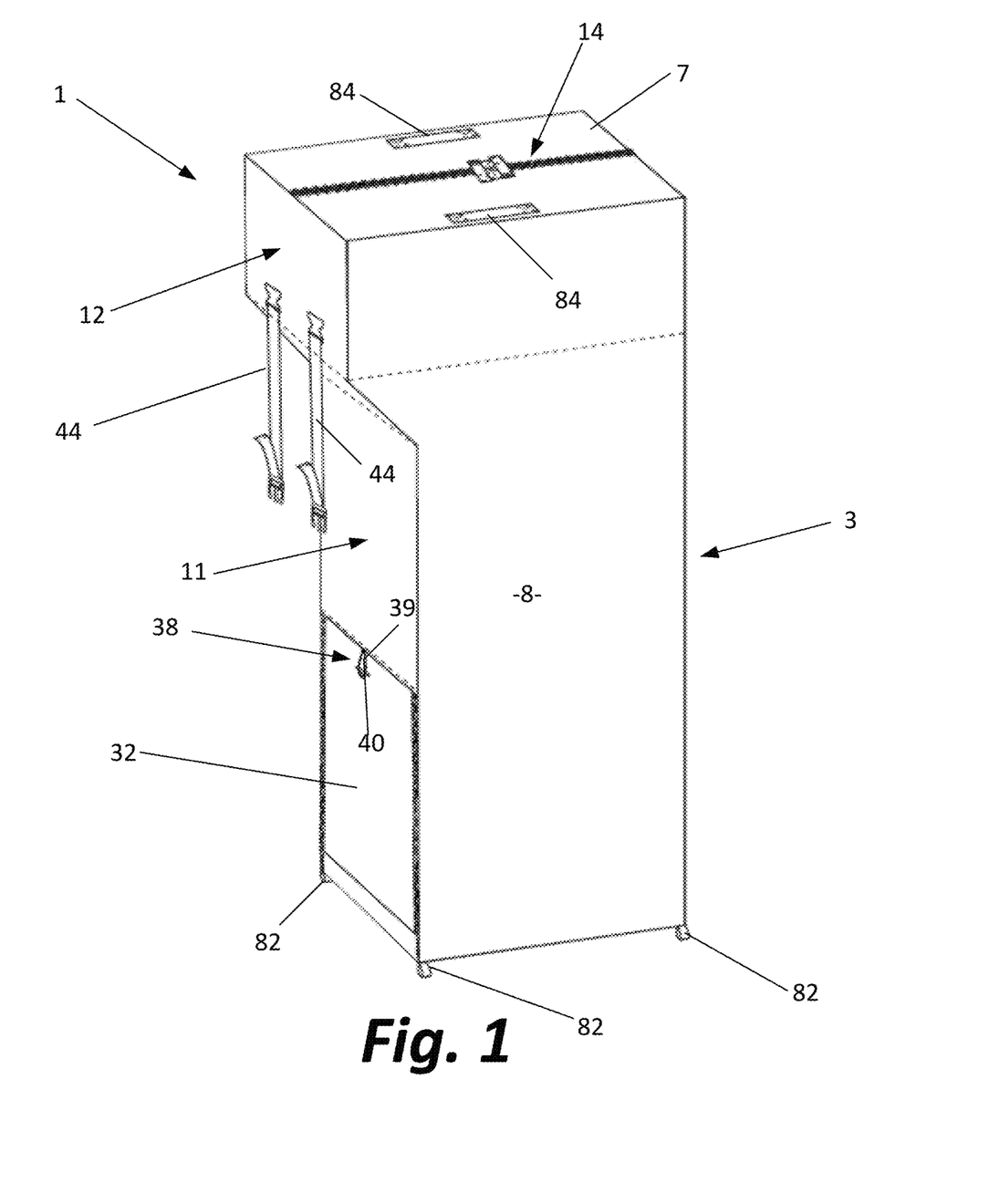
FIG. 1 is a perspective view of a game bag.
Figure 2:
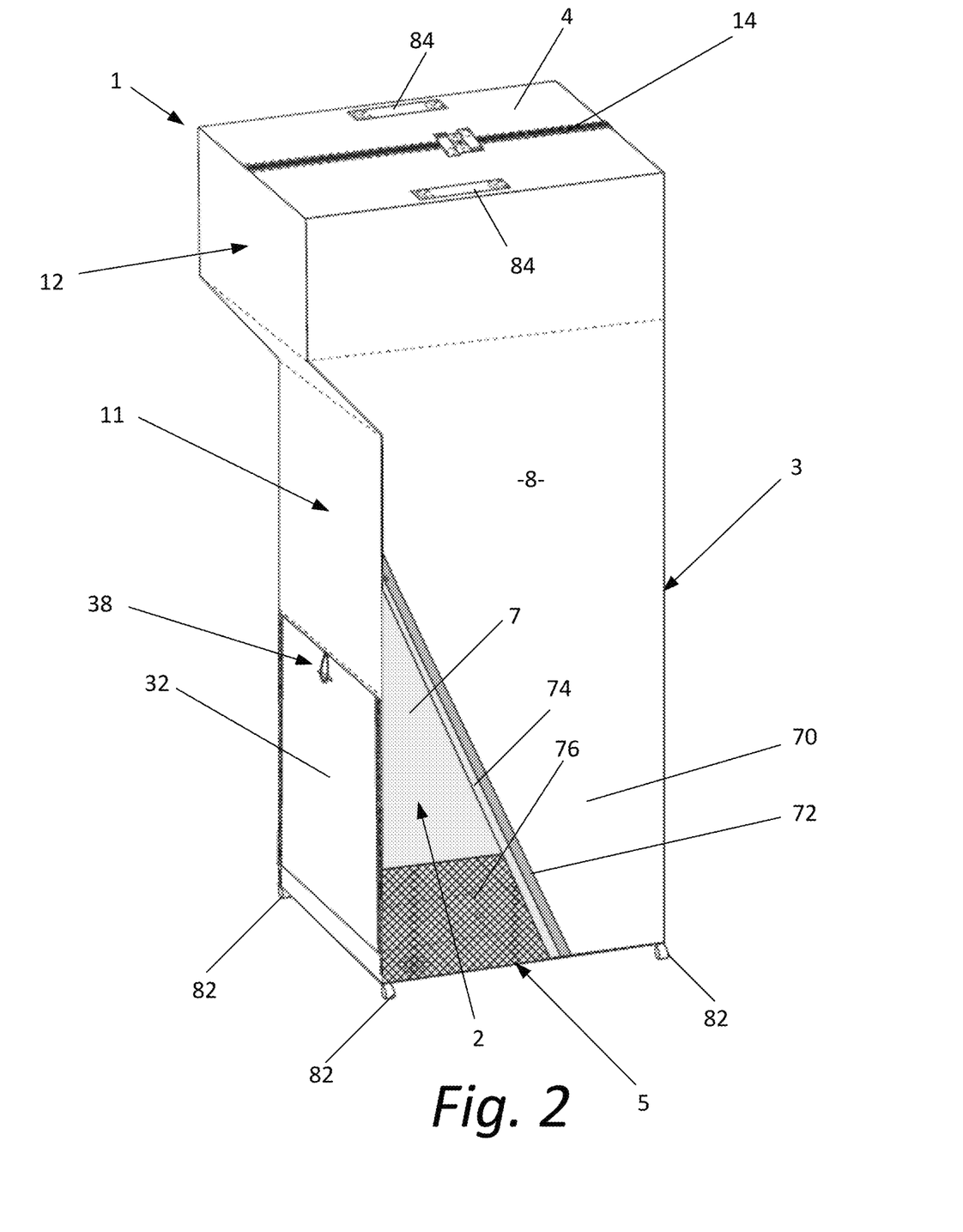
FIG. 2 is a second perspective of the game bag of FIG. 1 with a portion cut away to show how the walls of the shell of the game bag are constructed.

As shown in FIG. 2, the walls of shell 3 of game bag 1 may have a multi-layer construction comprising an outer layer 70, a middle layer 72 and an inner layer 74. By way of example, the outer layer 70 may be made of a polyester, the middle layer 72 may be made of a plastic closed cell fiber, and an inner layer may be made of a thin waterproof fabric.

The bottom wall 5 may be constructed in various ways. Bottom wall 5 may simply be a mesh panel such as mesh panel 76. Alternatively, and for greater durability and resistance to contamination by material found on the ground, the bottom wall may include a first panel 78 comprising the multi-layered construction described above. When this is the case, a plurality of drain/vent holes 80 may extend through panel 78. To prevent the ingress of pests (e.g., insects and rodents) into chamber 2 through these drain holes, the inner layer 74 may be lined with a mesh panel 78.

The game bag 1 may include various fasteners in addition to the various fasteners described above. Such additional fasteners may be in the form of zippers, buttons, snaps, buckles and other known types of fasteners and will be selected based on the specific item to be temporarily held in a desired position or orientation. To provide increased airflow, the size of the mesh covered openings may be increased or additional mesh covered openings may be provided.

Game bag 1 may include additional features. For example, loops 82 extending from shell 3 adjacent to the bottom wall 5 may be provided and used for a variety of purposes. Loops 82 may be used to attach a rope to the game bag 1 or to stake the bottom 5 of the game bag 1 to the ground. One or more handles 84 may be coupled to shell 3 to facilitate manipulation and transportation the shell 3. Such handles 84 will typically be secured to the top wall 4 or bottom wall 5 as shown, but may also be secured to any of the walls. As discussed above, one or more straps 44 may be coupled to the shell 3. These straps 44 may be adapted to hold the shell in a rolled-up position when the game bag 1 is not in use for transport or storage. While the ends of straps 44 shown are connected using cooperating buckle elements, other connecting elements may be employed. Examples include snap elements, button elements, hook and loop type elements, and the cooperating elements of other known types of fasteners. Additional straps may be provided for various purposes. For example, additional straps may also be provided to hold the shell open when zipper 15 is unzipped for cleaning or drying of the interior of shell 3.

Figure 15:
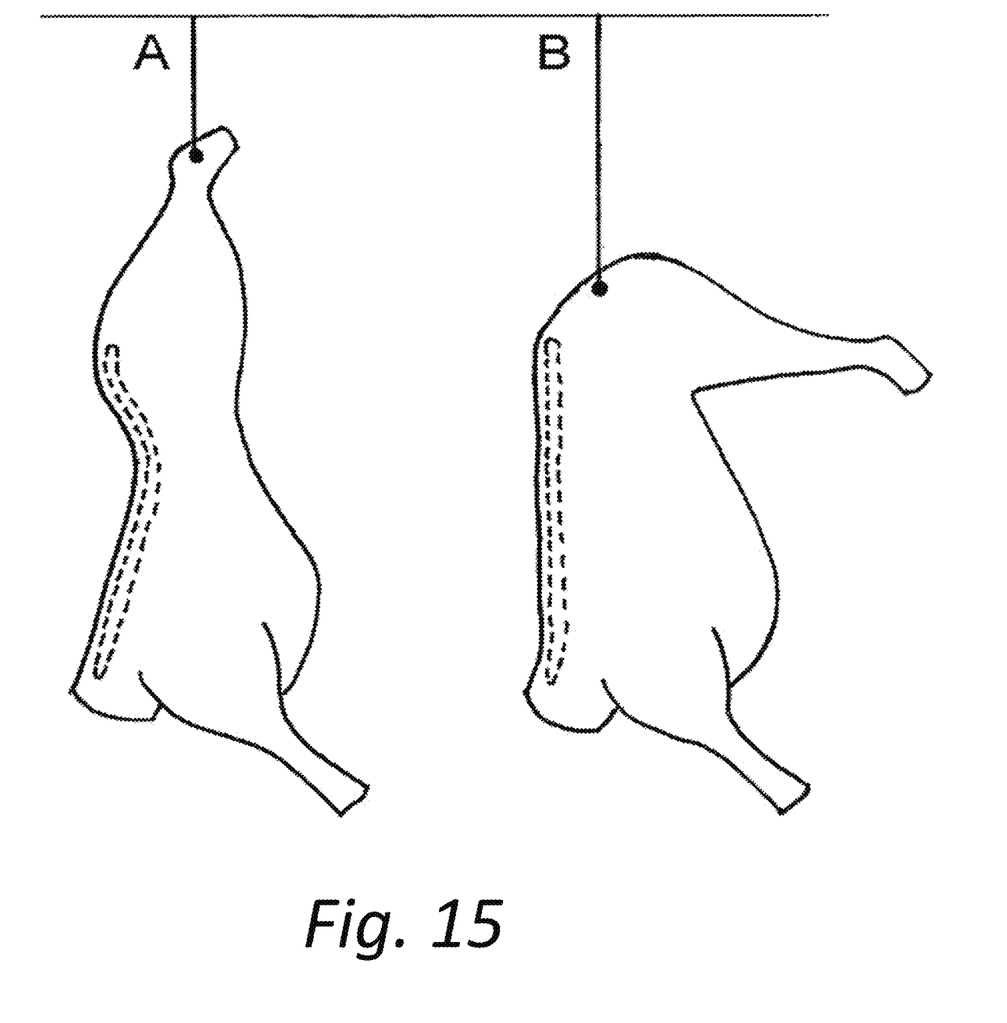
FIG. 15 is a schematic diagram illustrating (A) the "Achilles" method and (B) the "Tenderstretch" method of hanging a field dressed carcass.
Figure 16:
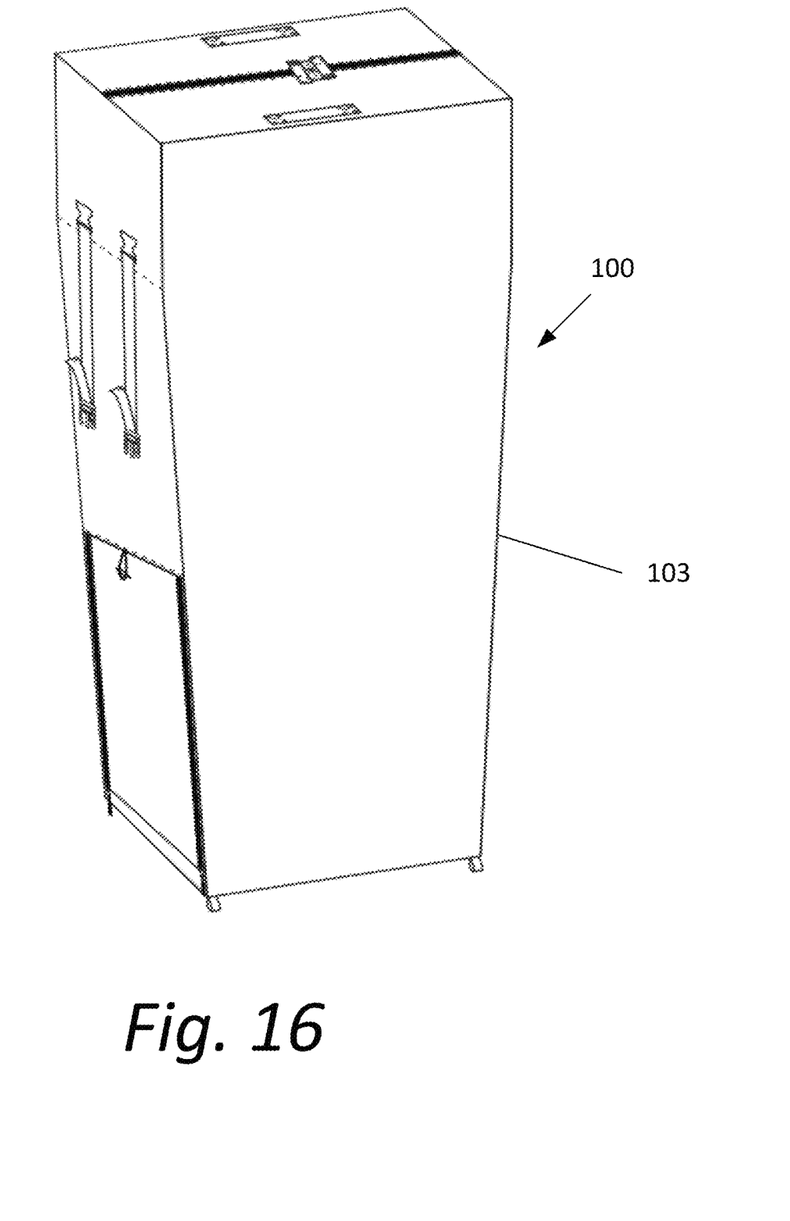
FIG. 16 is a perspective view of an alternative game bag.

Some hunters prefer to hang the carcasses of field dressed game using the "Achilles" method (see FIG. 15, illustration A) as opposed to the "Tenderstretch" method (see FIG. 15, illustration B). To accommodate this preference, the overall shape of the shell of the game bag and the interior chamber defined by the shell may be modified. Such a modification is illustrated in FIG. 16. Note that the game bag 100 illustrated in FIG. 16 has a shell 103, and thus an internal cavity, that is more elongated and tapered so the cavity has less volume at the top than at the bottom. The shell 103 also lacks the nose portion 12.

Within the scope of the following claims, the invention may be practiced otherwise than as specifically shown in the drawings, and described above. The foregoing description is intended to explain the various features and advantages, but is not intended to be limiting. The scope of the invention is defined by the following claims which are also intended to cover a reasonable range of equivalents.

What is claimed is:

1. A game bag comprising a chamber defined by a shell having a top wall, a bottom wall, a rear wall, and opposing side walls that are all substantially planar, and a front wall, the front wall comprising a substantially planar lower section and an upper nose section projecting forward of the planar lower section, said shell further comprising a zippered opening extending through the top wall and rear wall, an upper mesh covered opening extending through the rear wall and providing a first airflow path through the rear wall, an upper flap adapted to selectively extend over and close the upper mesh covered opening, a lower mesh covered opening extending through the planar lower section of the front wall and providing a second airflow path through the front wall, a lower flap adapted to selectively extend over and close the lower mesh covered opening, and a bracket adapted to mount a circulating fan to the shell at a location such that when the fan is operating the fan causes air to flow along the first airflow path, the second airflow path, and within the chamber.

2. The game bag of claim 1 wherein the shell is made of a multi-layer construction comprising an outer layer of polyester, a middle layer comprising a fabric made of a plastic closed cell fiber, and an inner layer of a thin waterproof fabric.

3. The game bag of claim 1 further comprising a first fastener adapted to hold at least a portion of the upper flap in a first closed position, and a second fastener adapted to hold at least a portion of the lower flap in a second closed position.

4. The game bag of claim 3 wherein said first fastener is a first hook and loop type fastener, and said second fastener is a second hook and loop type fastener.

5. The game bag of claim 1 further comprising a second upper mesh covered opening extending through the rear wall, and a second upper flap adapted to selectively extend over and close the second upper mesh covered opening.

6. The game bag of claim 1 further comprising a plurality of loops.

7. The game bag of claim 6 wherein at least one of said loops extends from the bottom wall.

8. The game bag of claim 1 further comprising at least one handle secured to the shell.

9. The game bag of claim 1 further comprising a lower flap zipper adapted to hold at least a portion of the lower flap in a closed position over the lower mesh covered opening.

10. The game bag of claim 1 further comprising at least one strap coupled to the shell and adapted to hold the shell in a rolled-up position.

11. The game bag of claim 10 wherein said at least one strap comprises a buckle for securing opposite ends of the strap together.

12. A game bag comprising a chamber defined by a shell having a top wall, a bottom wall, a rear wall, and opposing side walls that are all substantially planar, and a front wall, said shell further comprising a zippered opening extending through the top wall and rear wall, an upper mesh covered opening extending through the rear wall and providing a first airflow path through the rear wall, an upper flap adapted to selectively extend over and close the upper mesh covered opening, a lower mesh covered opening extending through a planar lower section of the front wall and providing a second airflow path through the front wall, a lower flap adapted to selectively extend over and close the lower mesh covered opening, and a bracket adapted to mount a circulating fan to the shell at a location such that when the fan is operating the fan causes air to flow along the first airflow path, the second airflow path, and within the chamber, wherein said bottom wall is lined with a mesh layer, and a plurality of drain holes extend through said bottom wall.

13. A game bag comprising a chamber defined by a shell having a top wall, a bottom wall, a rear wall and opposing side walls that are all substantially planar, and a front wall having a substantially planar lower section and an upper nose section projecting forward of the planar lower section, wherein said shell is made of a multi-layer construction comprising an outer layer of polyester, a middle layer comprising a fabric made of a plastic closed cell fiber, and an inner layer of a thin waterproof fabric, said shell further comprising a zippered opening extending through and along substantially an entire length of the top wall and rear wall, an upper mesh covered opening extending through the rear wall and providing a first airflow path through the rear wall, an upper flap adapted to selectively extend over and close the upper mesh covered opening, a lower mesh covered opening extending through the lower section of the front wall and providing a second airflow path through the rear wall, a lower flap adapted to selectively extend over and close the lower mesh covered opening, a plurality of drain holes extending through the bottom wall wherein the bottom wall is lined with a mesh layer, and a bracket adapted to mount a circulating fan to the shell at a location such that when a circulating fan attached to the bracket is operating the fan causes air to flow along the first airflow path, along the second airflow path and within the chamber.

14. The game bag of claim 13 further comprising a first fastener adapted to hold at least a portion of the upper flap in a first closed position and a second fastener adapted to hold at least a portion of the lower flap in a second closed position.

15. The game bag of claim 13 further comprising a second upper mesh covered opening extending through the rear wall, and a second upper flap.

16. The game bag of claim 13 further comprising at least one handle secured to the top wall and at least one handle secured to the bottom wall.

17. The game bag of claim 13 further comprising at least one strap coupled to the shell and adapted to hold the shell in a rolled-up position.

18. The game bag of claim 13 further comprises a plurality of loops.

* * * * *